Dec. 6, 1932.  A. FAZIO  1,889,981
SEEDING ATTACHMENT FOR TRACTORS
Filed Oct. 26, 1927  2 Sheets-Sheet 1
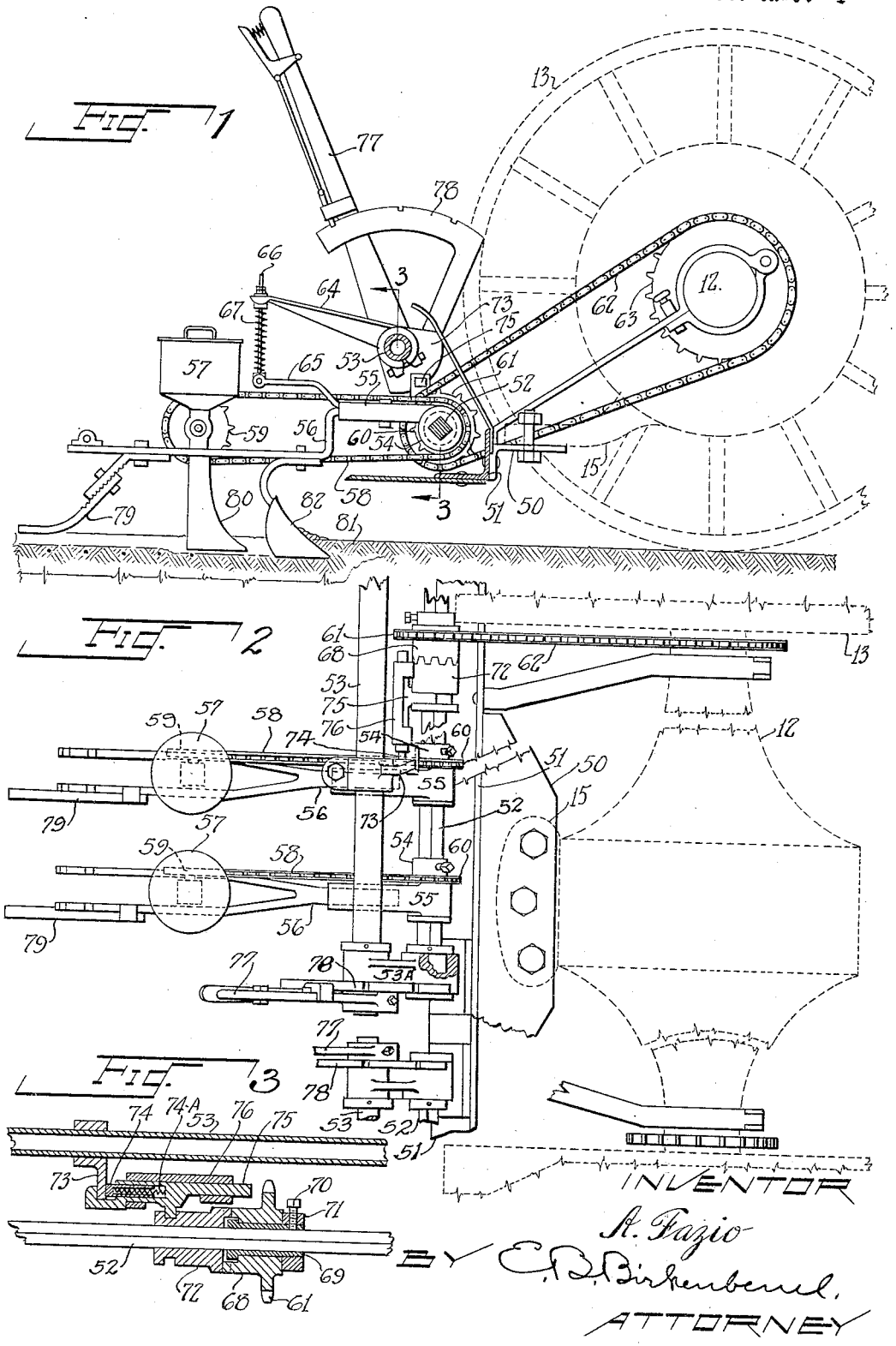

Dec. 6, 1932.  A. FAZIO  1,889,981
SEEDING ATTACHMENT FOR TRACTORS
Filed Oct. 26, 1927  2 Sheets-Sheet 2
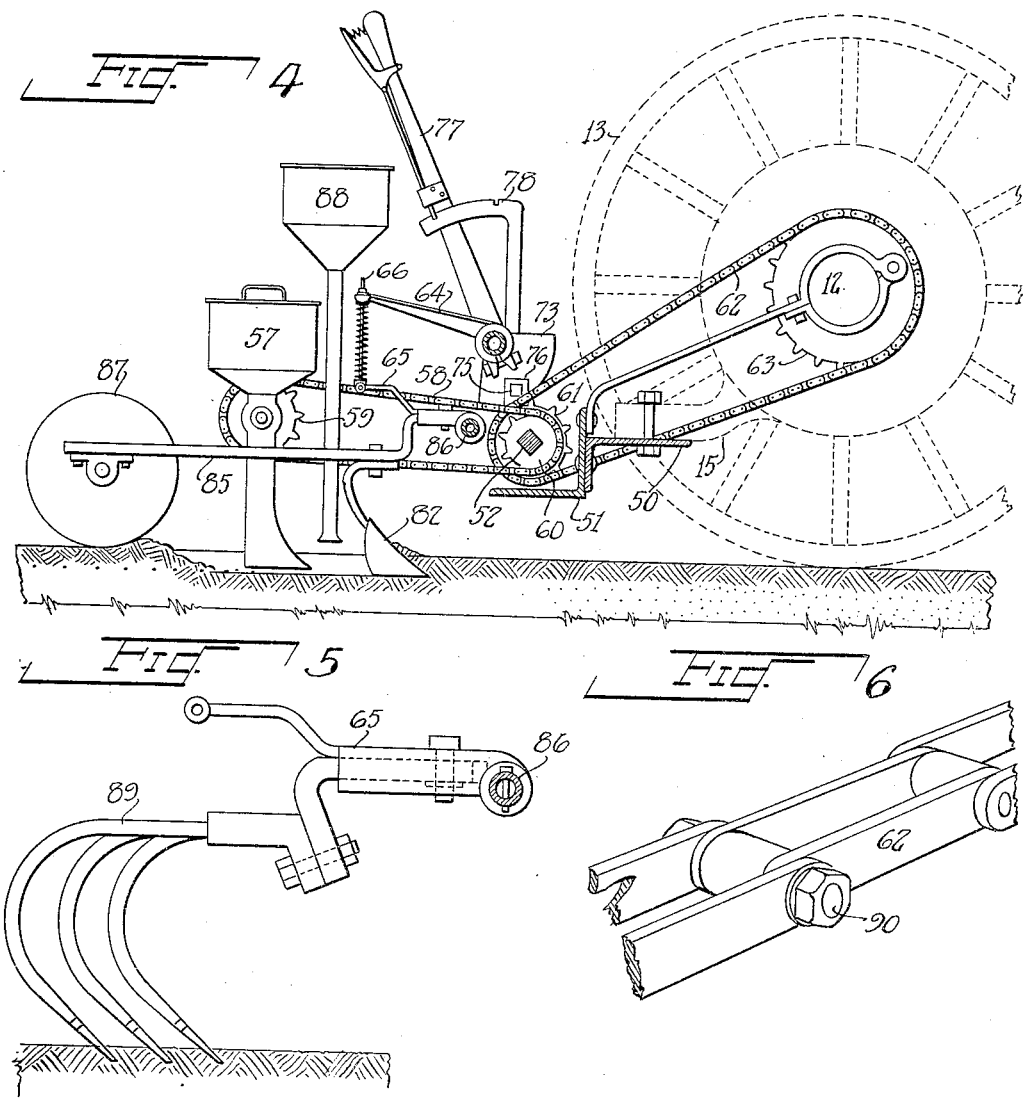

Patented Dec. 6, 1932

1,889,981

UNITED STATES PATENT OFFICE

ANTONIO FAZIO, OF PORTLAND, OREGON

SEEDING ATTACHMENT FOR TRACTORS

Application filed October 26, 1927. Serial No. 228,773.

This invention relates generally to agriculture, and particularly to an attachment for tractors adapted to facilitate seeding, fertilizing and cultivating all crops planted in rows.

The main object of this invention is the saving of time for the farmer.

The second object is to make it possible to plant the seed at any depth desired with extreme uniformity of planting.

The third object is to permit the planting of the seed at the correct time—that is, when the ground is in the right condition, owing to the fact that less time is required than under existing conditions.

The fourth object is to make it possible to have all of the rows planted exactly parallel with each other, or at least sufficiently so for all practical purposes.

The fifth object is to eliminate the usual loss of land at the ends of the rows by permitting planting to the extreme end of each row.

The sixth object is to facilitate cultivation by making the rows parallel for use with either power or hand cultivators.

The seventh object is to improve the condition of the ground while planting owing to the fact that the machine itself acts as a clod masher if passed over the soil at the right time, which is the ideal condition for seeding; whereas undesirable results would follow if a heavy tractor were passed over the ground before or after such condition was reached.

The eighth object is to secure a great economy in labor, since one man with a tractor can do as much work as thirty-five can do by hand with less fatigue and with a greater degree of accuracy than it would be possible by the most expert hand seeder.

The ninth object is to so construct the device that it can be readily attached to or removed from the tractor by any unskilled person without the use of any tools other than an ordinary wrench.

These, and other objects, will become more apparent from the specification following as illustrated in the accompanying drawings, in which:

Fig. 1 is a side elevation of one form of the device in which power is supplied from the tractor wheels, in which form the seeder is hinged on the shaft which drives the seeder mechanism. Fig. 2 is a plan of the device showing the clutch throw-out from which the lifting bars are omitted. Fig. 3 is a section taken along the line 3—3 in Fig. 1. Fig. 4 shows a modification which is similar to that shown in Fig. 1 except that the seeders are driven by sprockets on one shaft and hinged on a separate bar. Fig. 5 illustrates a hoe attachment and its connection to the device. Fig. 6 is a perspective view of a portion of the operating chain showing the removable connection.

Similar numbers of reference refer to similar parts throughout the several views.

Referring in detail to the drawings, it will be observed that the mechanism is driven from the wheels 13 of the the tractor itself. In order to make this possible there is provided a bracket 50 which carries the angle bar 51, over which is mounted a square shaft 52 and a round tubular shaft 53. The square shaft 52 and the round tubular shaft 53 journal in the bearings 53—A which are mounted on the bracket 50. On the shaft 52 is placed a slidable sleeve 54 on which is rotatably mounted the arm 55, which carries the forked beam 56 on which is mounted the seed hopper 57. The operating chain 58, which passes around the sprocket wheel 59 of the seeder, is driven from the sprocket wheel 60 on the shaft 52. Rotary motion is supplied to the shaft 52 by the sprocket wheel 61 through the chain 62 which passes around the sprocket wheel 63 which is attached to the drive wheel 13. The shaft 53 is provided with a plurality of lifting arms 64, each of which is joined to an arm 65 of a beam 56 by means of a bolt 66.

A spring 67 is interposed between the arms 64 and 65 to permit the individual seeding attachment to be raised independently of its adjacent units.

In order to enable the operator to stop the power feed, the sprocket wheel 61 is provided with a clutch jaw 68. The sprocket wheel 61 is free to rotate on the sleeve 69 whose position is determined by the set screw 70 which passes through the collar 71 and also the end of the sleeve 69. Meshing with the jaw 68 is a slidable jaw 72 having a square opening to receive the shaft 52.

On the shaft 53 is mounted a cam arm 73, against whose side bears the pin 74 of the clutch shifting arm 75 which is slidably mounted in the bracket 76. Rotary motion is supplied to the shaft 53 through the hand lever 77, which can be held in any desired position by the quadrant 78.

A tail skid 79, which is preferably made adjustable, is provided to hold the beam 56, with its attached seeder parts, at the desired elevation. In this instance the planting shoe 80 admits the seed to the ground 81 in which the furrow is previously made by the plow 82, which is also secured to the beam 56, but slightly in advance of the shoe 80.

The operation of this form of the device is as follows: Assuming that the operator desires to start the planting of a plurality of rows of seed, he wheels the tractor around into position whereby the various planting units will be directly above the position of the rows about to be planted. By manipulating the lever 77 he lowers all of the planting units, first those on one side and then those on the other—that is to say, the right hand units are all independent of the left hand units, and vice versa. As he does so he allows his tractor to move forward keeping one wheel 13, or one of the front wheels (not shown) in line with the mark previously made by a marker chain (not shown.) As he lowers his seeders to the ground by means of the lever 77, the particular section being lowered is thrown into gear by reason of the fact that the shaft 53 will rotate the cam arm 73 which, by effort of the spring 74—A within the pin 74, urges the jaw 72 into engagement with the jaw 68 on the sprocket wheel 61.

Obviously, the seeds are dropped at a rate proportional to the speed of the tractor so that when the tractor is standing still no seeds are dropped at all, making it unimportant whether the tractor is traveling or not, and also if the planting shoe 80 is not in the ground then no seeds are being dropped, due to the fact that the clutch jaws 68 and 72 are out of engagement.

In the form shown in Fig. 4, instead of hinging the plow beam 85 on the axis of sprocket wheel 60, a separate shaft 86 is provided and a roller 87 is mounted on the rear end of the beam 85 for the purpose of packing the soil after the seed is sown, both to conserve the moisture and to bring the soil in proper contact with the seed.

It is often preferable to provide a fertilizer drill 88 behind the plow 82, and this can be done without in any way interfering with the operation of the device.

In Fig. 5 is shown the manner in which a cultivator 89 can be attached to the arm 65 for cultivating purposes, which works out very well since all of the rows are planted in parallel relation to each other, it is just as easy to keep a number of cultivators between the rows as it is one, since they are all securely fastened together and the rows are uniformly spaced.

For the purpose of easily installing or attaching the device to a tractor it is necessary to provide a removable connection for the chain 62, which consists of a bolt 90, the removal of which makes it possible to quickly disconnect the chain from the tractor.

It will be understood that it is desirable to have one operating lever 77 control all the planting elements on the right side of the center line and a second lever controlling similar elements on the left hand side, partly, because it facilitates the maneuvering of the implement and also divides in two parts the load which must be lifted by a single lever 77.

While it is a well known fact that grain drills and seeders of various types have been constructed in the past and that I, therefore, do not claim such devices broadly, I do intend to cover all such forms and modifications of this device as fall fairly within the appended claims.

I claim:

1. The combination of a tractor having a rearwardly extending and laterally projecting frame attached thereto; a pair of rock shafts mounted over said frame transversely with said tractor, the inner ends of said shafts being adjacent, each inner end having an operating lever mounted thereon; a plurality of ground-engaging implements each of which is hinged to said supporting frame at its forward end and having means engaging the ground for supporting each rearward end thereof; means operable from one of said hand levers acting through its rock shaft for raising all of the implements on one side of the longitudinal center line of the tractor in unison; similar means for operating all of the elements in the group on the opposite side of said center line; a planting mechanism on each of said implements having means for driving same at a speed proportionate of the forward travel of the tractor; and means for rendering said driving means operative when all of the planting mechanisms on their respective sides of the tractor are lowered to a planting position.

2. A planter for tractors consisting of a transverse bar adapted to be secured to a tractor, a pair of independent seeding sections attached to said bar, each of said sections including one square and one tubular shaft, both of which are rotatably mounted on said bar, said square shaft having driving connections from the power plant of the tractor, a lever for rocking said tubular shaft, a plurality of planting elements hingedly connected to said square shaft and driven therefrom, each of said planting units having a lifting arm attached thereto and secured to said tubular shaft whereby any planting unit can be lifted independently of the others and all can be raised in unison by the lever which rocks said tubular shaft, a clutch on the drive for said square shaft, a cam on said tubular shaft adapted to engage said clutch when the planters are lowered, and means for holding the planting units in a raised or a lowered position.

ANTONIO FAZIO.